United States Patent

Terada

[15] 3,641,852
[45] Feb. 15, 1972

[54] STRIPPING METHOD AND APPARATUS FOR INSULATED COVERED WIRE AND CABLE

[72] Inventor: Manzo Terada, Kitakatsuragi-gun, Nara Prefecture, Japan

[73] Assignee: Nissho Iwai Company Limited, Osaka, Japan

[22] Filed: Oct. 24, 1969

[21] Appl. No.: 869,307

[30] Foreign Application Priority Data

Nov. 12, 1968 Japan.................................43/82719

[52] U.S. Cl..........................................83/1, 83/54, 83/430, 83/924, 81/9.51
[51] Int. Cl. .......................................................H02g 1/12
[58] Field of Search.............................83/1, 4, 54, 430, 924; 81/9.51

[56] References Cited

UNITED STATES PATENTS

| | | | |
|---|---|---|---|
| 1,687,466 | 10/1928 | Stevens................................... | 83/430 |
| 2,434,640 | 1/1948 | Burdwood............................. | 81/9.51 X |
| 2,435,660 | 2/1948 | Tileston ............................... | 83/924 X |
| 3,176,549 | 4/1965 | Burdwood ............................. | 81/9.51 |
| 3,195,379 | 7/1965 | Kramer et al.......................... | 81/9.51 |
| 3,462,052 | 8/1969 | Wagner ................................. | 81/9.51 |

*Primary Examiner*—William S. Lawson
*Attorney*—Ernest G. Montague

[57] ABSTRACT

A stripping device and method for insulated covered wire and cables, providing an automatic and continuous stripping apparatus for perfect recovery of the metal core from various wires or cables which are different in size and construction, providing a forced pressure to the insulation cover at the place where four angle parts are formed in each pair of oppositely facing concave grooves which are engraved with different widths in the outer peripheral surfaces of a pair of rotatables facing rollers, insuring the stripping to be performed.

5 Claims, 4 Drawing Figures

PATENTED FEB 15 1972 3,641,852

INVENTOR
MANZO TERADA
BY
ATTORNEY

3,641,852

STRIPPING METHOD AND APPARATUS FOR INSULATED COVERED WIRE AND CABLE

DETAILED DESCRIPTION OF THE INVENTION

The present invention relates to a stripping method for electric insulated covered wire and cables, and more particularly to a method of enabling an automatic and continuous stripping of almost all kinds of insulated covered wires and cables including Plastic covered cable, cotton covered cable, glass fiber shielded cable, aluminum core cable and particularly inclusive of such stranded cable as is shown in FIG. 3.

The primary object of this invention is to perform the stripping of various wires and cables which are miscellaneously different in their size and construction, without creating a public nuisance problem and without causing any deterioration of quality of the metal cores applied, but with an increase of the efficiency in recovering the metal core by several times as that of the conventional method but with an increase of the efficiency by several times over that of the conventional method.

The conventional method in almost all cases was to burn out the insulated covered wires and cables for the purpose to collect, thereby the metallic scraps. However, in such conventional method, a public nuisance problem has developed because of a bad smell generated in the burning-out process, and besides there has seen a deterioration of quality of the metal cores applied.

With these and other objects in view, which will become apparent in the following detailed description, the present invention will be clearly understood in connection with the accompanying drawing, in which.

Figure 4:
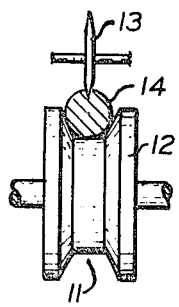
FIG. 4 is a front view, partly in section, illustrating an embodiment of the prior art.

A conventional method is illustrated in FIG. 4, the structure for which comprises a rolling cutter 13 situated above a rotatable roller 12 with a certain clearance between the former and the latter, and the roller 12 is engraved with a concave groove 11, inside of which an insulated covered cable 14 is forced to race freely in a tensioned state, while during the racing period of the cable in the groove 11, the rolling cutter 13 rotates and cuts open the insulation cover of the cable 14.

In the practice of this conventional method, however, it becomes necessary firstly to change the roller 12 into a new one, each time a different diameter cable is to be applied in the respective case, and to make an adjustment of the clearance distance between the rolling cutter 13 and the roller 12, since the cables to be applied are not only different in their size but also curved differently.

Secondly, in this conventional method, on account of the fact that the change of the roller 12 and the adjustment of the clearance between the roller 12 and the rolling cutter 13 solely relies upon one's judgement, there have been some cases occasionally of an overcutting or a less-cutting of the cables.

In case of an overcutting, it results in causing scars upon the metal core. Furthermore, in conventional method, it also becomes necessary later to do the job of separation of the insulation cover from the metal core by one's power, since the cut-open point is of a single streak, and consequently the insulation cover is not completely detached yet from the metal core even after the passage of the cables through the apparatus.

In order to completely eliminate those drawbacks of the conventional method, as a result of persistent study for many years by the inventor, the present invention has been carried out, providing an efficient method of stripping the insulation cover of almost all kinds of electric wires and cables without creating a public nuisance problem, and without causing any deterioration of quality of the metal cores applied.

Figure 1:
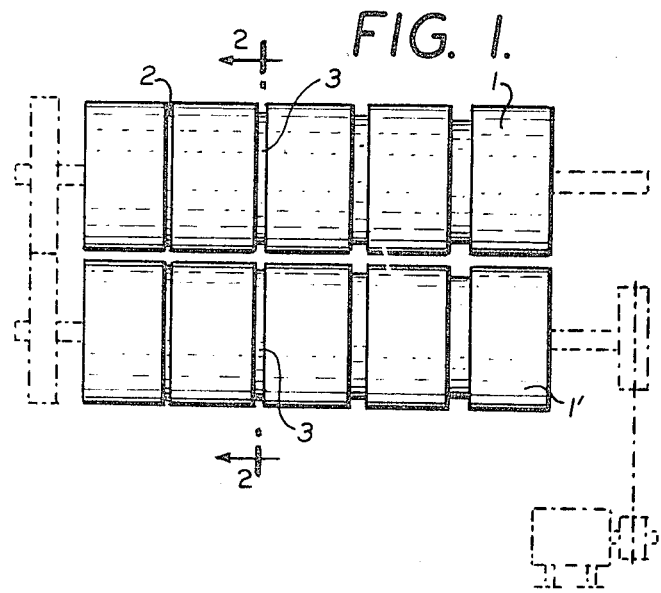
FIG. 1 is a front elevation of an embodiment of the present invention.
Figure 2:
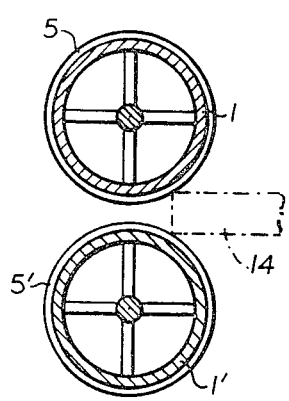
FIG. 2 is a cross section taken along the lines 2—2 of FIG. 1.

Referring now to the drawings, and more particularly to FIG. 1, there is illustrated one embodiment of the present invention comprising a pair of rotatable facing rollers 1 and 1' of which the diameter is to be predetermined. On the outer peripheral surfaces of the rollers 1 and 1', multiple pairs of concave grooves 2, 2', 3, 3' and so forth are provided in oppositely facing position for each pair respectively with graduatedly different width relative to each other, so as to accept the insertion of various cables thereto.

Figure 3:
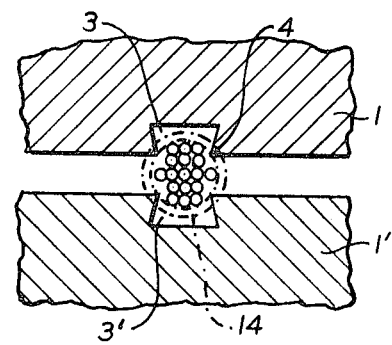
FIG. 3 is a fragmentary enlarged view of FIG. 1.

While FIG. 3 shows a fragmentary enlarged view of the essence of this stripping apparatus; i.e., an angle part 4 formed in a pair of facing concave grooves. By means of four angle parts 4 comprising two angle parts each of the upper groove and the lower groove, respectively, a heavy pressure is forced to be given to the portion of the insulation cover, which results in perfect stripping of the insulation cover of the cables applied.

On the other hand, referring back to FIG. 1, the distance of the clearance between the roller 1 and 1'; i.e., consequently the distance of the clearance between each pair of the concave grooves 3 is designed to be adjustable by arranging either roller 1, 1' to be movable upward or downward, so as to suit for insertion thereto, various wires and cables which are different, respectively, in their size and construction, and further different in their kind like cotton covered cable, glass fiber shielded cable, aluminum core cable and so on.

With respect to the function and the effects of this stripping apparatus, firstly, by driving a motor, both rollers 1 and 1', for example, rotate simultaneously, and during the rotation of both rollers an insulated covered cable 14 is inserted in the clearance between the concave grooves 3 and 3'. When the rotating roller 1 or 1' is adjusted so that the distance between the upper groove 3 and the lower groove 3' reaches to the extent to be almost equal to the diameter of the metal core applied in its particular case, a heavy pressure is forced to be given to the portion of the insulation cover successively by means of four angle parts 4 formed in a pair of facing concave grooves 3 and 3'. And, as a consequence, the insulation cover is forced to be separated from the metal core perfectly (see FIG. 3).

At the time when the insulation cover is separated from the metal core, the portion of the insulation cover is forced to slit itself with four streaks thereupon, of which two streaks of the slitted insulation covers drop down in front of the rollers 1 and 1', while the other two streaks remaining in the grooves 3 and 3' are brought forward in the proceeding direction to be collected into collecting jigs 5, 5', which are mounted in front of the concave grooves 3, 3'.

Thus, perfect stripping of the insulated covered cables is automatic and continuous.

As above described, since the present invention does not employing a cutter or cutters for the stripping like the conventional method does, but since the present invention is utilizing four angle parts 4 formed in each pair of facing concave grooves for slitting the insulation cover, there is no occurrence of an overcutting or a less-cutting of the insulated covered wires or cables as occasionally occur in the practice of the conventional method.

Besides, since the metal core applied in the present stripping method is forced to pass through the apparatus in the original state and to be exposed outside after the passage through the apparatus, there is no occurrence of deterioration of the quality of the metal cores applied as has seen in the burning-out method.

Furthermore, in the use of the present stripping apparatus, there is no necessity for an operator to straighten the wires or the cables in advance of the insertion of them into the apparatus, but he has merely to feed the cables into the insertion hole, and then the stripping is performed automatically; while on the other hand, the selection of a suitable hole for the insertion of various cables which are different respectively in their diameter can be accomplished by pursuing an approximate average point of those different diameters, and by an operator's skill utilizing four angle parts 4 formed in the concave grooves 3 and 3'.

In other words, for the selection of a suitable hole for the insertion of a cable, there is no necessity to make so accurate mechanical adjustment of the clearance between the upper groove 3 and the lower groove 3' as is essentially required in the use of conventional stripping apparatus, but an operator has merely to set up a standard average of the different diameters in their similar group of cables.

As the result, the operation of the present stripping apparatus is performed very smoothly with an increase of the efficiency by several times as that of the conventional method, which is another advantage and a conspicuous effect of the present invention.

Consequently, the present invention provides an efficient method enabling perfect recovery of the metal core from various insulated covered wires and cables without creating a public nuisance problem and without causing any deterioration of the quality of the metal cores applied.

While the inventor discloses single embodiment of the present invention, it is understood that the embodiment is given by example only and not in a limited sense.

What is claimed is:

1. An apparatus for stripping insulated covered wire and cables, comprising
   a pair of rotatable facing and spaced rollers having a plurality of pairs of oppositely facing concave grooves in their outer peripheral surfaces, and
   said facing concave grooves each defining two edges at the peripheral surface of said rollers, respectively, and spaced from each other by a distance less than the diameter of the core of a wire or cable to be stripped and the corresponding edges of said concave grooves of said respective rollers being aligned, whereby a forced pressure is provided by said edges formed in each pair of said facing concave grooves upon insertion of a wire or cable between said concave grooves having a core at least equal to the spacing of said peripheral surfaces of said rollers from each other.

2. The apparatus, as set forth in claim 1, wherein
   said concave grooves are substantially rectangular in cross section, and
   said edges form an angle of approximately 90°.

3. The apparatus, as set forth in claim 2, further comprising
   means cooperating with said concave grooves for stripping cut coverings from said concave grooves.

4. The apparatus, as set forth in claim 3, wherein said edges are unsharpened.

5. A method for stripping insulated covered wire and cables, comprising the steps of
   continuously applying opposed pressure to, and effecting cuts into, portions of an insulated cable or wire at four points and directed nontangentially toward the core thereof, whereby the covering of said cable or wire is cut into four portions, and
   removing said four portions from said core.

* * * * *